W. J. RYLANDER.
Straw Cutter.
No. 4,794.
Patented Oct. 3, 1846.
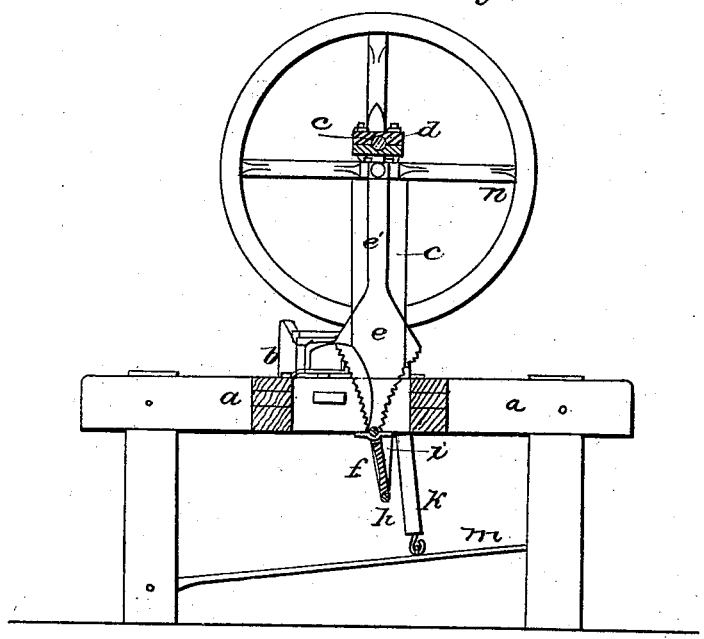

UNITED STATES PATENT OFFICE.

W. J. RYLANDER, OF COLUMBUS, GEORGIA.

STRAW-CUTTER.

Specification of Letters Patent No. 4,794, dated October 3, 1846.

*To all whom it may concern:*

Be it known that I, WILLIAM J. RYLANDER, of Columbus, in the county of Muscogee and State of Georgia, have invented a new and useful Improvement in Straw Cutters, and that the following is a full, clear, and exact description of the principle or character which distinguishes it from all other things before known and of the manner of making, constructing, and using the same, reference bing had to the accompanying drawings, making part of this specification, in which—

Figure 1 is an upright section of my machine.

The nature of my invention consists in forming and hanging the knife of a straw cutter so as to cut with a diagonal down stroke across the box giving the most effective application of the knife to the purpose for which it is designed.

The construction is as follows: On a suitable frame (*a*) a cutting box (*b*) is fastened and on one side of it two uprights (*c*) are erected on the frame to support a crank shaft (*d*) to which the knife is attached. This knife (*e*) is a plate of steel of a diamond shape, the upper corner having a bar (*e′*) projecting up from it to connect with the crank above named; the sides of the diamond shaped plate below the widest part is concaved slightly and is made sickle-edged, as clearly shown in the drawing the lower corner of the knife connected with an arm (*f*) on a shaft (*h*) below the frame and connected therewith by two brackets (*i*). The upper shaft is turned by a crank (not shown in the drawing) connected by a pitman (*k*) with a treadle (*m*); (*n*) is a fly wheel on the same shaft, and being in front of the knife is shown in red ink.

The blade when dull can be turned around and the other edge brought into use.

The knife thus constructed and operated has the full effect of the sickle in reaping it holds the straw still by the teeth being made to act on the straw with a drawing stroke as described.

What I claim as my invention and desire to secure by Letters Patent, is—

The knife constructed in the manner described in combination with the manner of working the same, so that it shall cut down across the box with a diagonal drawing stroke, as above set forth.

WM. J. RYLANDER.

Witnesses:
 A. P. BROWNE,
 J. J. GREENOUGH.